United States Patent Office 3,514,650
Patented May 26, 1970

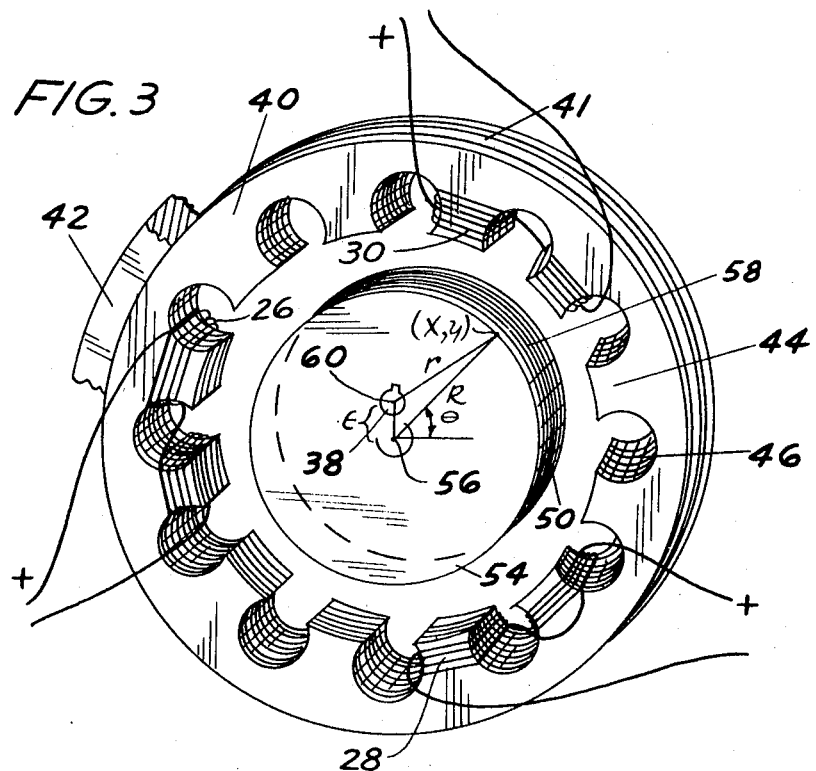

3,514,650
VARIABLE RELUCTANCE SYNCHRONAL DYNAMO
William P. Caywood, Jr., Murrysville, Pa., assignor to the United States of America as represented by the Secretary of the Army
Filed Oct. 2, 1968, Ser. No. 764,512
Int. Cl. H02k 17/42
U.S. Cl. 310—168
13 Claims

ABSTRACT OF THE DISCLOSURE

A rotor for a variable reluctance dynamoelectric machine having a stator on which are mounted a series of stator coils which receive a high frequency carrier signal. The outer surface of the rotor is shaped to vary sinusoidally with angular displacement about the rotor axis. Rotation of the rotor modulates the high frequency carrier signal with the sine wave due to the shape of the rotor.

---

This invention relates to devices which function on an electro-mechanical principles, and by which a mechanical, control input can be made to detect an electrical signal that represents the position or angle of the input shaft. Such a device could be referred to as a synchro, selsyn, position tachometer, or variable reluctance synchronal dynamo.

Conventional devices which preform the same electro-mechanical function consist of synchros, selsyns, and position tachometers which are incapable of operation at velocities ranging from high values down to and including zero velocity. In general, conventional prior art devices used to perform a tachometer function do not operate at comparable efficiencies, or without brushes, commutators, slip rings, or sliding contacts. These prior art devices were also incapable of generating a true sine wave function. A truly sinusoidal current is one in which the voltage value changes according to the law of sines. Prior art devices were incapable of generating a function which did not include large distortions and harmonics. The energy converting devices according to the prior art did not incorporate magnetic circuits which would enable a smooth transition in the flux and hence the output waves were distorted.

The present invention incorporates a rotor having an outer peripheral surface which is shaped to vary sinusoidally with angular displacement about the rotor axis. This rotor is disposed within a stator which has a series of coils placed within slots formed in said stator. The coils are energized by a high frequency carrier signal from an external source. As the rotor member rotates within the stator, the length of the air gap between the rotor and stator members also is caused to vary sinusoidally. The amount of flux which is caused to flow within the magnetic circuit which includes the rotor also is caused to vary sinusoidally due to the shape of the rotor and the air gap. The resulting sinusoidally varying flux thereby modulates the high frequency carrier in a manner that depends on the exact position of the mechanical input shaft.

The device according to the present invention includes several embodiments. Two of the various embodiments incorporate laminated magnetic material. Each of the laminations has an outer arcuate surface that is either circular or elliptical in shape. The third embodiment incorporates no magnetic material but instead utilizes electrically conductive circular cylinders which rotate within the stator member to achieve the desired modulated power output.

It is therefore an object of the present invention to eliminate aforesaid limitations of the prior art systems.

It is another object of the present invention to provide in a new and improved configuration, a simple, rugged, and long-lasting tachometer device that generates electrical signals which indicate the position and velocity of the mechanical input.

It is a further object of this invention to provide electrical signals in accordance with the aforementioned objects in a device that contains no brushes, commutators, slip rings, or sliding contacts.

It is still another object of the present invention to provide a device in accordance with the aforementioned objects that is convenient to construct in sizes and shapes that would be prohibitive in previously known devices.

It is yet another object of the present invention to provide electrical signals in accordance with the aforementioned objects in a device that operates with equal efficacy at all velocities from the maximum for which depicted design allows, down to and including zero velocity.

A still further object of the present invention is to provide a device that accepts electrical power in the form of a high frequency carrier, and which modulates this power in a manner that depends on the exact position of the mechanical input shaft to thereby deliver modulated power as an electrical signal.

Other objects and advantages of the present invention will become apparent to those of ordinary skill in the art by the following description when considered in relation to the accompanying drawing of which:

FIG. 3 is a perspective view of the variable reluctance tachometer utilizing a rotor according to a second embodiment of the invention.

FIG. 4 is yet an other perspective view of the variable reluctance tachometer according to the invention which utilizes another embodiment of the rotor.

Figure 1:
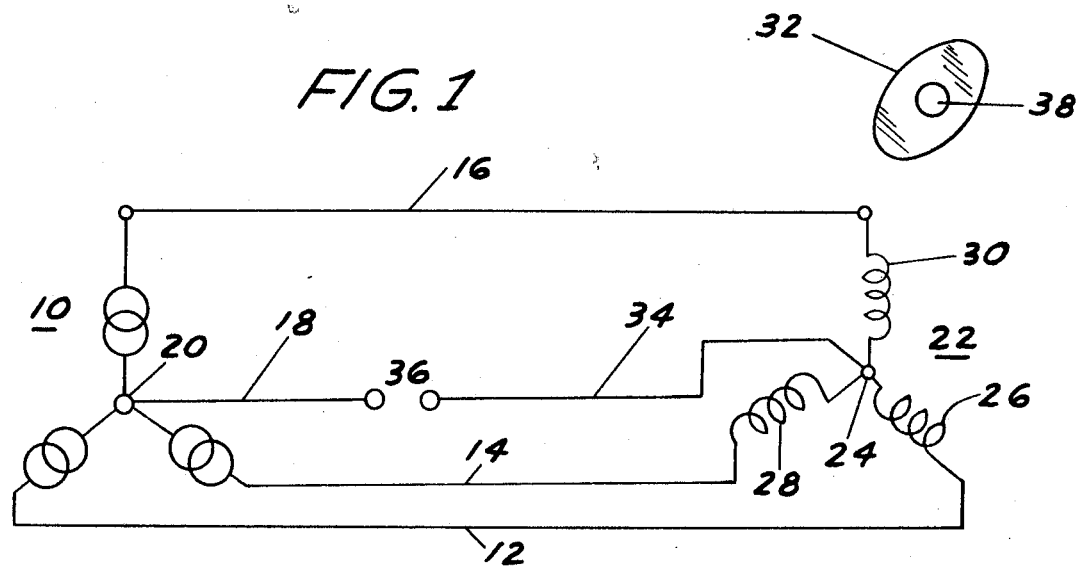
FIG. 1 is an electrical schematic dagram of the variable reluctance tachometer according to the invention.

Referring now to the drawing, FIG. 1 represents the electrical circuit in which the present invention is incorporated. The circuit utilizes a three phase, four wire, constant amplitude voltage source indicated generally at 10. This three phase source is of a relatively high frequency, for example, 5,000 cycles per second. The output of source 10 is distributed to a three phase stator winding, indicated generally at 22, by means of conductors 12, 14, and 16. Stator winding 22 is composed of individual phase windings 26, 28, and 30 connected at a neutral point 24. Shown schematically at 32 is a rotor which is in relative close proximity to stator windings 22. Rotor 32 rotates on shaft 38 such that a small air gap is placed between the inner edges of the stator and the outer surface of the rotor. It has been found that by applying an alternating current (A.C.) voltage from source 10 to stator windings 22, and by sustaining this voltage to be of a constant R.M.S. value throughout the test, the R.M.S. current that flows in the winding is of a linear relationship to the measurable length (in a radial direction) of the air gap at the position of the winding, at least for all values of voltage less than that at which the resulting magnetic flux saturates the iron. As the rotor 32 rotates past stator windings 22, a modulated output signal flows down neutral wire 34 and 18 to neutral point 20 such that the output signal is detected at 36. The current that flows in the neutral, fourth wire 34–18 comprises the output signal. This output signal which is detected at 36 is of constant magnitude and of a phase that progresses linearly with advancement of the angle of the shaft.

Figure 2:
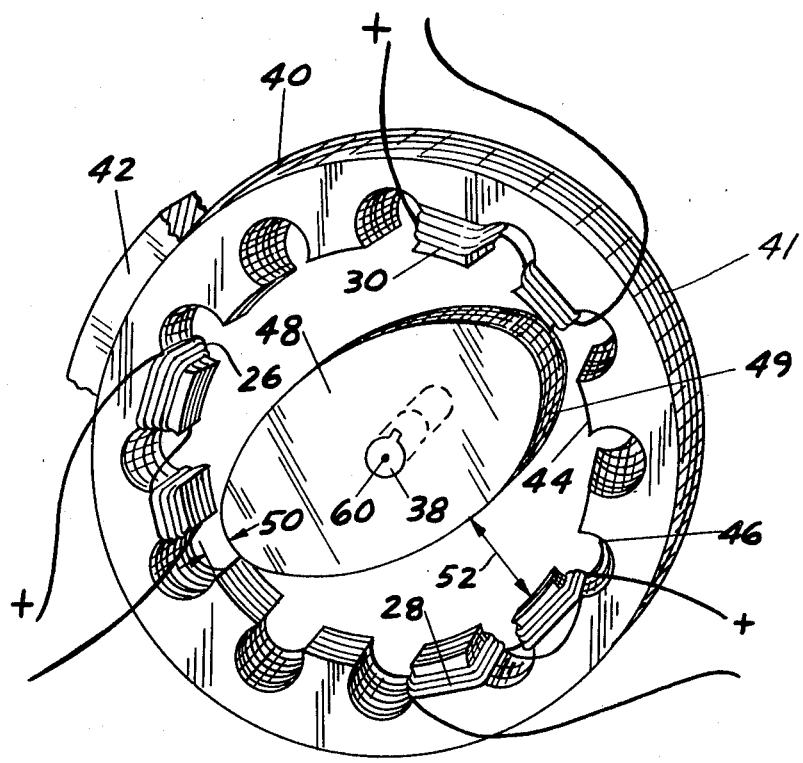
FIG. 2 is a perspective view of the variable reluctance tachometer which incorporates one embodiment of the rotor according to the invention.

In order to provide an electrical signal that is of equal strength and accuracy for any particular position of the input shaft 38, which is rotated at various rotational velocities and which exhibits consistency of strength and accuracy throughout the whole and repeated revolutions, it is very important that the rotor member 32 be designed according to the present invention. Referring now to FIG. 2, a dynamoelectric machine is shown that provides an electrical signal that has purity, accuracy, consistancy, and has such strength that without further power amplification it can be used to provide signal power to circuits and devices that in themselves absorb power. The reluctance tachometer shown in FIG. 2 has a stator member 40 which is mounted in a frame which is shown schematically at 42. Stator 40 may be solid, however, it is preferable that the stator be formed from layers of magnetic stampings. The device shown in the drawing has a plurality of teeth 44 and slots 46 formed therein. The stator windings are formed by positioning pairs of coils pairs of adjacent teeth of the laminated stack as shown in the drawing. The various pairs of coils are interconnected for use as a multi-phase set. There may be either 3 or 6 pair. The sets shown in FIG. 2 is for a three phase, line connected unit. The circuit for this unit has been previously described in relation to FIG. 1.

To provide the desired modulation of the input signal, a rotor 48 is mounted on shaft 38 which rotates about and is located on the rotor axis 60. As can be seen on the drawing, rotor 48 is a double lobed elliptically shaped rotor formed of individual layers of magnetic material 49. The stack of laminations is shaped by any suitable means such as milling. For instance an end milling cutter will suitably enable an operator to form the rotor according to the invention. If the axis of the cutter is in a radial direction from the rotor shaft. The rotating cutter of the end milling cutter may be moved at various angles of orientation about the rotor axis 60. Although any number of cuts may be taken, the following table is exemplary of a rotor which was formed by taking 60 cuts around one whole revolution of a stack of circular laminations.

TABLE I.—TO MAKE TWO LOBED, SINE FUNCTION ROTOR
[Table of machine cuts (total of sixty cuts) (0.04 inches variations)]

| Angles of orientation (degrees) | | | | Cuts off circular periphery (thousandths of inches) |
|---|---|---|---|---|
| 0 | 180 | | | 0.00 |
| 6 | 174 | 186 | 354 | 0.44 |
| 12 | 168 | 192 | 348 | 1.73 |
| 18 | 162 | 198 | 342 | 3.82 |
| 24 | 156 | 204 | 336 | 6.62 |
| 30 | 150 | 210 | 330 | 10.00 |
| 36 | 144 | 216 | 324 | 13.82 |
| 42 | 138 | 222 | 318 | 17.91 |
| 48 | 132 | 228 | 312 | 22.09 |
| 54 | 126 | 234 | 306 | 26.18 |
| 60 | 120 | 240 | 300 | 30.00 |
| 66 | 114 | 246 | 294 | 33.38 |
| 72 | 108 | 252 | 288 | 36.18 |
| 78 | 102 | 258 | 282 | 38.27 |
| 84 | 96 | 264 | 276 | 39.56 |
| 90 | | 270 | | 40.00 |

The device in the example shown utilizes an air gap of ten thousandths of an inch. The radius the rotor established by the cuts in the above mentioned example was calculated such as to make the air gap very sinusoidally about an average value of thirty thousandths of an inch. The maximum and minimum values for the air gap are therefore fifty thousandths and ten thousandths of an inch respectively. Although windings may also be placed about rotor 48, it is conventional that rotor remain free of windings. This results in a device that draws from the electrical supply mains no great amount of power above that furnished in turn to its electrical load as an electrical signal.

In the present embodiment shown in FIG. 2 therefore, there is described by this rotor a surface that is not circular but one of a very special shape that allows the air gap distance (between the inner edges of the stator teeth and outer surface of the rotor) to change with rotation of the rotor. It has been found to be important to have the center of rotation of the rotor 60 as the axis of symmetry of the stator, therefore, at each tooth there is an air gap that depends on the angle of the rotor, the function of dependance being the same as for each other tooth except with the angle of the rotor position being advanced by the amount by which the second considered tooth is angled with respect to the first.

It is convenient for the air gap to describe approximately a circular cylinder along its axis, however, it is obvious to one skilled in the art that a conic, or other figure of rotation, would be equally efficacious. The lengths of the stacks of lamination of the rotor and stator are conveniently the same, but not of necessity. The embodiment shown in FIG. 3 has a stator formed of stator laminations 41, a rotor 54 formed of laminations 58, and windings 26, 28, and 30. The assembly of elements is facilitated by a supporting frame 42, which positions the stator laminations together in what is known to the trade as a stack, that is, with their insulated surfaces in juxtaposition. The inner edge of the stator laminations comprise the stator surface of what is commonly referred to as the air gap. This surface is everywhere near to a circle, with its center at the axis symmetry 60, except for the slots 46 described and formed by the shape of the laminations. The existence of the slots, as mentioned before, allows the insertion of windings in said slots to allow a magneto-motive force to be induced in the air gap. The windings are said either to lie in the slots or else to surround the teeth 44 to stack comprising the laminations 41. The slots 46 in the corresponding teeth 44 are formed by the angular positioning of the like laminations 41. The laminations are generally so aligned that the slots 46 thus formed are caused to be straight and extend parallel to the rotor axis, although the practice employed in electric motors of "skewing" the slots may have benefit. In employment of the embodiment here described, windings are necessary to allow external electrical circuits to communicate with the magnetic circuit. It has also been discovered that the performance of the device is best if the windings are employed in pairs, with corresponding adjacent coils being reversed so as to create a flux path of "in" one tooth and "out" the other. It is convenient, but not necessary for the demonstration of this invention, to distribute windings around the periphery of the stator at a uniform interval. The performance of the device is optimized and the largest linear variation incurred is realizable if the minimum air gap 50 is made to be as small as possible. Also, it has been observed that if the rotor periphery is properly shaped, the variations in the root means square (R.M.S.) values of the current in a particular coil pair are sinusoidal under conditions of constant value of applied "carrier" frequency and voltage, and a constant relatively low rotational velocity of the rotor. The proper shape of the rotor, as mentioned before, to obtain a sinusoidal variation in carrier current is found to be such that the air gap length (in a radial direction) is in itself a sinusoidally varying function of the angular position.

If suitably constructed and if connected in a suitable circuit, there is generated a signal current whose magnitude is independent of the angular position of the rotor, but in contrast whose phase is in a direct, linear relationship to the angular position of the rotor. As mentioned in relation to FIG. 2, one such suitable construction requires three coil pairs uniformly displayed around the periphery of the stator, and an otherwise suitable rotor whose shape is such as to generate a sinusoidally varying air gap as it is rotated at a uniform rate. In the tachometer according to the embodiment shown in FIG. 3, the rotor is an "almost circular," magnetic device. In rotation, it generates an air gap that varies sinusoidally at each point. It is important that the length of the air gap not become to great or the linear relationship between the air gap and the resulting electrical variations is lost. In contrast ot the rotor shown in FIG. 2, the rotor 54 in FIG. 3 has only a single lobe, to obtain one cycle of phase advance per revolution. Each of the laminations 58 which go to make up the stack of rotor laminations is circular with respect to axis 56. The axis of rotation on the other hand is axis 60 which is displaced from the lamination axis 56 by a distance ϵ. The radius (r) so generated, as a function of angle θ, is related to the radius of the circle (R) by an expression that in rectangular coordinates, is given by:

$$r^2 = x^2 + (y-E)^2$$
$$= R^2 - 2yE + E^2$$

Noting that:
$$y = R \cos \theta$$

$$r^2 - E^2 = R^2 \left(1 - \frac{2E \cos \theta}{R}\right)$$

If:
$$E << R$$

then
$$r \cong R \left(1 - \frac{E \cos \theta}{R}\right)$$

and
$$r = R - \cos \theta$$
$$R - r = E \cos \theta$$
$$E = \frac{R-r}{\cos \theta}$$

Rotation of the circular shaped laminations which go to make up the rotor pack 54, about its offset rotor axis 60 results in an air gap which varies sinusoidally at each point.

In order to enhance the output signal of the devices disclosed and described in FIGS. 2 and 3 segments of conducting material were placed on the rotor surface, in the voids created at those angles where the air gap had been enhanced. These segments of conducting material were intended to shield, and reduce further, the field at those regions. It was discovered that if carried to an extreme and if the magnetic material were completely removed, the machine thus modified, did not exhibit an enhanced signal, however, it did exhibit a uniformity of output that had not been witnessed previously. Carrying the idea of using segments of conducting material to a greater extent resulted in the embodiment shown in FIG. 4. This embodiment is completely free of magnetic materials. The rotor is constructed of two circular cylinders 64, and 66. Each of the cylinders 64 and 66 are constructed of electrically conducting material and are completely void of any magnetic material. As can be seen in the drawing, cylinders 64 and 66 are secured to non-magnetic shaft 62 and intersect at points 68 and 70. As can be seen in the drawing, the shape of the cylinders 64, and 66 is circular and that each of the cylinders is of substantially the same diameter. By means of example and not by means of limitation, a unit which has adequately performed had two circular cylinders, each of which had a diameter of five eighths of the inside diameter of the stator. As can be also seen from the drawing each of the circular cylinder 64 and 66 are positioned parallel with the axis of the rotor and offset from it so as to provide a minimum clearance of air gap at two diametrically opposite point 72 and 74. Rotation of them as a pair results in a sine wave output form in the stator windings as desired.

The signal level can be increased by obviating the mutual coupling that exists between coil pairs. To obviate the coupling, radial cuts may be placed in the stator laminations at such angles as to separate each coil pair from the other. Another method by which the coupling may be obviated is by utilizing shorted terms lying in radial planes and surrounding the torodial stator. This would separate the influence of each coil pair from each other one.

It has also been discovered that the signal current may be enhanced by a factor from 5 to 10 by inserting in the mutual phase, return wire, a capacitor of the optimum size. A further discovery with the circuit disclosed in FIG. 1 is that by inserting a resistance load in series with mutual phase returned wire, a signal power is developed that is considerable, and in fact by proper choice of resistance is of the order of ten percent of the volt-amperes supplied for the various phases of the stator windings.

In operation, the rotor, which is mounted on the shaft, will be caused to rotate within the fixed stator member. A high frequency current energizes the stator windings and sets up a magnetic flux flowing within the magnetic circuit of stator 40. The magnetic flux thus set up will be caused to enter the rotor element as it passes by the adjacent teeth. The amount of flux passing in and out of teeth will vary proportional to the length of the air gap established between the rotor surface and the stator teeth. As the air gap becomes increasingly small, the flux passing will become increasingly large. On the other hand, as the gap becomes increasingly large, the amount of flux flowing in or out of the adjacent tooth will become increasingly small. Hence, it can be seen that the variation in flux is inversely proportional to length of the air gap. As mentioned previously, the surface of each of the rotors varies sinusoidally with angular displacement about the rotor axis 60. The air gap length therefore, is in itself a sinusoidally varying function of the angular position. The resulting flux variations cause the high frequency carrier wave to be modulated by a true sine wave. The signal output thus developed at 36 in FIG. 1 is modulated in accordance with the sine wave thus imposed on the carrier signal. This modulated signal can be utilized to determine the exact position of the mechanical input shaft.

What has been described therefore is a three phase reluctance tachometer dynamo, which utilizes a multiplicity of carrier signals of a single frequency that may be of a multiplicity of phases. The carrier signals are modulated in accordance with the position of the mechanical input shaft such that the modulation amplitude of the different carriers are not always identical. Further, they are such that under conditions of a constant mechanical velocity of input, they form functions that are in themselves a multi-phase set. The phase relation is so inter-related that the generation of power for the control of a multi-phase motor is thereby facilitated. The device, due to the particular sinusoidal varying surface of the rotor member, causes the high frequency carrier to be modulated by means of a true sine wave without extreme variations as was known in the prior art. The dynamoelectric machine according to the present invention is not responsive to otherwise disturbing magnetic fields or mechanical vibrations. This machine is further able to provide electrical signals without regard to ambient temperature for all temperatures up to that which can be withstood by the insulation of the windings installed therein, or up to the curie temperature of the magnetic material of the structure, whichever is lower.

Although the device has been described with reference to a three phase reluctance tachometer, it should be noted that the rotor could be utilized in any dynamoelectric machine.

Although the device according to the invention has been described with reference to a three phase source and a three phase stator winding, it should be realized that any number of phases may be utilized.

Since it is obvious that many changes and modifications can be made in the above-described details without departing from the nature in spirit of the invention, it is to be understood that the invention is not limited to said details except as set forth in the appended claims.

What I claim is:

1. A rotor for a dynamoelectric machine which rotates about an axis having an inner cylindrical surface, an outer peripheral surface and two side surfaces, the radial thickness of the material between the side surfaces varying sinusoidally with angular displacement about said axis.

2. A rotor for a dynamoelectric machine which rotates about an axis having an outer arcuate peripheral surface which is shaped to vary sinusoidally with angular displacement about said axis.

3. A rotor according to claim 2 further comprising a stack of laminations located in a plane normal to the rotor axis, the outer peripheral surface of each of said laminations being shaped to vary sinusoidally with angular displacement about said axis.

4. A rotor for a dynamoelectric machine according to claim 3 wherein each of said laminations is elliptically shaped.

5. A rotor for a dynamoelectric machine according to claim 3 wherein each of said laminations are circular with respect to a second axis which is displaced from said rotor axis.

6. A rotor for a dynamoelectric machine as set forth in claim 5 wherein the radius of the arcuate periphery of each of said laminations with respect to said rotor axis is equal to $$R\left(1-\frac{E}{R}\cos\theta\right)$$

where R is the radius of the circular laminations, E is the amount which the rotor axis is displaced from said axis, and $\theta$ is the angle of displacement about said second axis.

7. A rotor as set forth in claim 2 wherein all of the material utilized in said rotor is non-magnetic.

8. A rotor as set forth in claim 7 further comprising two cylinders of conductive material that are of substantially the same diameter.

9. A rotor as set forth in claim 8 wherein the cylinders are circular and are positioned parallel with and offset from the rotor axis.

10. In a variable reluctance dynamo comprising a stator having teeth extending radially inward, slots formed between said teeth and coils positioned in said slots and around said teeth, and a rotor which is rotatable about an axis and within said stator having an inner cylindrical surface, an outer arcuate peripheral surface and two side surfaces, the radial thickness of the material between the side surfaces varying sinusoidally with angular displacement about said axis.

11. In a variable reluctance dynamo as set forth in claim 10 wherein the rotor further comprises a plurality of layers of elliptically shaped magnetic material located in a plane normal to said axis, the outer peripheral surface of each of said laminations being shaped so as to vary the width of the air gap sinusoidally with angular displacement about said axis.

12. A variable reluctance dynamo as set forth in claim 10 wherein the rotor further comprises a plurality of layers of magnetic material which are circular with respect to a second axis and located in a plane normal to said rotor axis, said rotor axis being displaced from and parallel to said second axis.

13. A variable reluctance dynamo as set forth in claim 11 wherein the rotor further comprises two circular cylinders of conductive material that are of substantially the same diameter and are positioned parallel with and offset from the rotor axis so as to provide a minimum clearance of said air gap at two diametrically opposite points.

References Cited

UNITED STATES PATENTS

| | | | |
|---|---|---|---|
| 2,630,561 | 3/1953 | Mueller | 310—261 |
| 3,171,049 | 2/1965 | Jarret | 310—168 |
| 3,281,655 | 10/1966 | Blasingame | 310—168 |

FOREIGN PATENTS 644,733  10/1950  Great Britain.

WARREN E. RAY, Primary Examiner

R. SKUDY, Assistant Examiner

U.S. Cl. X.R.

310—180